J. HARRIS.
CUTTING TORCH.
APPLICATION FILED JULY 31, 1916.
1,302,157.
Patented Apr. 29, 1919.
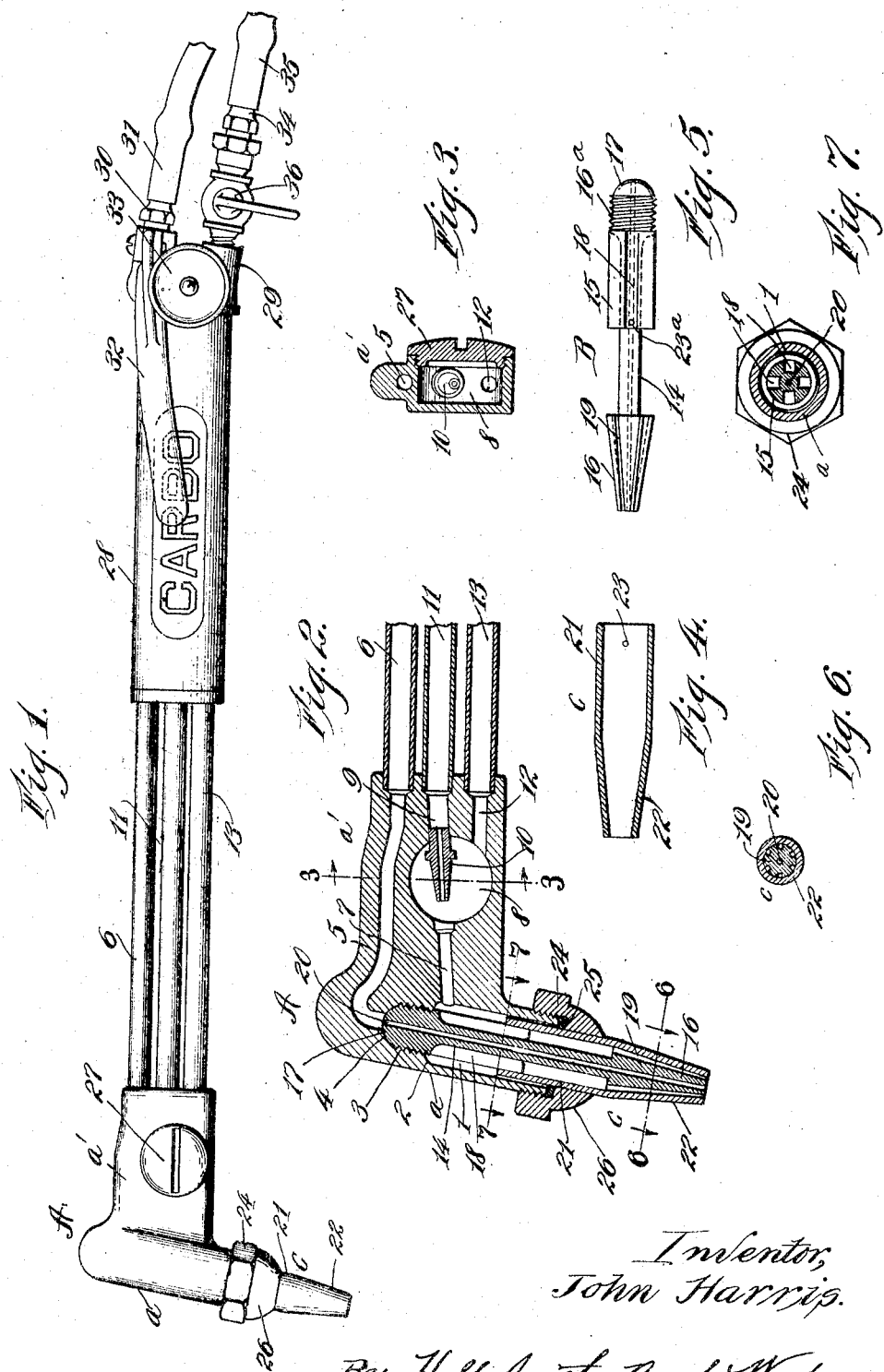
Inventor,
John Harris.
By Hull, Smith, Buck West.
Attys.

UNITED STATES PATENT OFFICE.

JOHN HARRIS, OF CLEVELAND, OHIO, ASSIGNOR TO CARBO HYDROGEN COMPANY OF AMERICA, OF PITTSBURGH, PENNSYLVANIA, A CORPORATION OF DELAWARE.

CUTTING-TORCH.

1,302,157.   Specification of Letters Patent.   Patented Apr. 29, 1919.

Application filed July 31, 1916. Serial No. 112,223.

*To all whom it may concern:*

Be it known that I, JOHN HARRIS, a citizen of the United States, residing at Cleveland, in the county of Cuyahoga and State of Ohio, have invented a certain new and useful Improvement in Cutting-Torches, of which the following is a full, clear, and exact description, reference being had to the accompanying drawings.

This invention relates to burners or torches of the type employed in the arts of cutting and welding with gases, and has for its general object to provide a torch of this character which shall be of high efficiency while comparatively simple and inexpensive of production. Further and more limited objects of the invention are to provide a torch wherein the flame produced by the combustion of the mingled gases will not be affected by slight and temporary variations in the pressure of the gas supplied through the regulators; also to provide a torch wherein the injector for the oxygen which is mingled with the combustible gas will be so constructed and located as to render the same easily accessible for the purposes of cleaning and removing any material that might tend to clog the injector or the conduit or conduits leading therefrom to the operative end of the torch. Further objects and advantages of the invention will be pointed out hereinafter and will be realized in and through the combination of elements embodied in the claims hereto annexed and illustrated in the drawings forming part hereof, wherein Figure 1 represents a side elevation of a torch constructed in accordance with my invention; Fig. 2 a longitudinal sectional view taken through the head of the torch and its associated parts; Fig. 3 a sectional detail corresponding to the line 3—3 of Fig. 2; Fig. 4 a longitudinal sectional view through the outer member of the removable tip; Fig. 5 a side elevation of the inner member of said tip; while Figs. 6 and 7 are details corresponding respectively to the lines 6—6 and 7—7 of Fig. 2.

Describing by reference characters the various parts illustrated herein, A denotes generally the head of the burner or torch said head being conveniently formed as a casting having a shell or casing $a$ and a lateral projection $a'$ containing the conduits which conduct oxygen and a mixture of oxygen with a combustible gas to the members of the tip which are detachably secured within the shell. For convenience of description, the burner or torch will be considered as being used in the position shown in Figs. 1 and 2, and the terms "top", "bottom", "upper", and "lower" will be used to designate the relative positions of the various parts, without, however, limiting the use of the torch to any particular position. The shell $a$ is provided with a combined mixing and expansion chamber 1 extending upwardly thereinto from the lower end thereof, the top of said chamber being defined by an annular wall 2, there being a threaded bore 3 extending upwardly from said chamber. The upper end of this bore is rounded, as shown at 4, whereby it forms a seat corresponding to the rounded upper or inner end of the inner tip member. An oxygen passageway 5 extends from the upper end of the bore substantially through the lateral projection $a'$, where it is supplied with oxygen through the pipe 6.

Extending from the upper portion of the chamber 1 is a passageway 7 for a mixture of oxygen and combustible gas the rear end whereof communicates with a cylindrical chamber 8 in the extension $a'$ of the head A. Removably mounted in an oxygen passageway 9 opposite the passageway 7 is an injector nozzle 10, said nozzle extending the greater part of the distance across the chamber 8 and being in axial alinement with the inlet to the passageway 7. As will be seen, the passageways 7 and 9 are at one side of the center or axis of the cylindrical chamber 8 and the rear or inlet end of the passageway 9 is supplied with oxygen from a tube 11. 12 denotes a passageway for combustible gas in the extension $a'$ of the head A extending rearwardly from the chamber 8 and communicating with said chamber near the bottom thereof. The rear end of the passageway 12 is supplied with such combustible gas through a pipe 13.

The tip employed with the head comprises an inner and an outer member which are similar in construction respectively to the inner and outer tip members shown in my application No. 877,649, filed December 17, 1914. The inner member, indicated generally at B, comprises a reduced cylindrical portion 14, an upper cylindrical enlargement or projection 15, and a lower frusto conical projection 16. The upper portion of the projection 15 is provided with a thread $16^a$ while the upper end of said projection is rounded, as shown at 17, whereby the said inner member may be conveniently applied to and removed from the head with its rounded end 17 seated against the correspondingly rounded portion 4 above the bore 3, said bore receiving the thread 16ª. Below the thread 16, the projection 15 is provided with a plurality of slots 18. Four such slots are shown (although the number may be varied) and each slot extends from the thread 16ª to the bottom of the projection, the slots being milled inwardly substantially as far as the intermediate reduced portion 14.

The tapered projection 16 is provided with a plurality of substantially rectangular slots 19 extending inwardly from the outer surface thereof and providing restricted passageways for the mixture of gases supplied through the chamber 1. The particular manner of forming these slots is described and claimed in my application hereinbefore identified. The inner member B is provided with a central restricted passageway 20 extending therethrough, said passageway registering and communicating with the passageway 5.

Coöperating with the inner tip member B is the outer member C. This member has a cylindrical upper end 21 and a frusto conical lower end 22 which frusto conical portion is adapted to fit closely about the projection 16 and to close the outer sides of the slots 19. The internal diameter of the upper cylindrical portion 21 is such as to form a close fit with the lower end of the projection 15. The inner and outer tip members constitute a removable tip and, in practice, will be connected by one or more pins, indicated at 23 on Fig. 4, coöperating with one or more holes in the inner member, indicated at 23ª, Fig. 5. For the purpose of providing a non-leaking joint between the outer tip member and the lower end of the shell a, I employ a packing gland nut 24 which is threaded onto the lower end of the head.

Beneath the threaded portion, the nut is provided with an inwardly extending shoulder, and below this shoulder there is an extension 26 which provides an elongated bearing with the exterior of the tip, thereby to center the same with reference to the head and the chamber 1. The outer surface of the extension 26 is rounded inwardly and downwardly toward the tip to provide a shedding surface for the molten metal or slag, this arrangement being especially advantageous when the torch or burner is operated in an inverted position.

It will be observed (see particularly Fig. 3) that the outer end of the chamber 8 is provided with a thread whereby the chamber may be conveniently closed by a removable cap 27. This, together with the arrangement of the parts within the chamber, renders the injector 10 and the coöperating passageways 7 and 12 conveniently accessible for the purpose of cleaning or removing sediment from these parts as well as for the purpose of removing a particular injector and replacing the same with another of different capacity—the capacity of the injector being correlated to the capacity of the coöperating tip.

The pipes 6, 11, and 13 extend through a casing 28 which may constitute a handle for operating the torch. At the rear end of said casing these pipes communicate with a casting 29 having suitable passageways therethrough arranged to communicate with said pipes, and two of these passageways are supplied with oxygen through the connection 30 in the flexible tube 31, the passageway communicating with the pipe 6 being controlled by a valve operated by the forwardly projecting lever 32, as shown and described in detail in my application No. 877,049 aforesaid, the oxygen passageway communicating with the tube 11 being controlled by the valve 33. The passageway for combustible fluid and the pipe 13 are supplied by the connection 34 and a flexible pipe 35, the combustible gas being controlled by a valve 36.

In operation, (using the torch for cutting purposes) combustible gas and oxygen will be turned on through their valves 36 and 33 to the chamber 8. It will be observed that the combustible gas is delivered tangentially into said chamber, which imparts a whirling motion to the same whereby a preliminary mixing of the gas with oxygen will be secured within the chamber. The mixture of oxygen and combustible gas will be conducted through the passageway 7, slots 18 and slots 19 to the lower or operating end of the burner or torch where the mixture will be ignited and may be employed for preheating purposes (in the case of cutting) or for welding purposes,—as may be desired. Assuming that the torch is used for cutting purposes, as soon as the metal is heated to the proper temperature, the lever 32 will be depressed, thereby turning on the oxygen to the passageway 5 and the central bore 20.

The provision of the chamber 8 is an improved feature of my invention, since it secures a substantially constant and even preheating flame notwithstanding such variations in pressure in the gases supplied thereto as are incidental to the operation of these torches, and especially variations in the pressure as supplied from the ordinary regulators. Furthermore, the construction secures a complete and intimate mixture of the oxygen with the combustible gas, notwithstanding the fact that the injector is located within the head and that the mingled gases travel a comparatively short distance from their point of unison to the point of use.

Having thus described my invention, what I claim is:—

1. In a burner of the character described, the combination of a head and a tip, said head having a passageway for conducting a mixture of a combustible fluid and a combustion-supporting fluid to said tip, said head having a cylindrical chamber with which the inlet end of said passageway communicates at one side of the axis of said chamber, an injector carried by the head and projecting into said chamber in substantially axial alinement with the inlet to said passageway, a conduit for supplying a combustion-supporting fluid to said injector, and a conduit discharging tangentially into said chamber and conducting a combustible fluid thereto.

2. In a burner of the character described, the combination of a head and a tip, said head having a passageway for conducting a mixture of fluids to said tip and a cylindrical chamber with which the inlet end of said passageway communicates at one side of the axis of said chamber, an injector projecting into said chamber in substantially axial alinement with the inlet to said passageway, a conduit for supplying fluid to said injector, and a conduit discharging tangentially into said chamber and conducting another fluid thereto.

3. In a burner of the character described, the combination of a head and tip, said head having a passageway adapted to deliver a mixture of a combustible and a combustion-supporting fluid to said tip and having a cylindrical chamber with the upper portion whereof the inlet end of said passageway communicates, an injector projecting into said chamber in substantially axial alinement with such inlet, means for supplying a combustion-supporting fluid to said injector, and a conduit for a combustible fluid communicating with the lower portion of said chamber and extending from the side thereof from which the said injector projects.

4. In a burner of the character described, the combination of a head and a tip, said head having a passageway for conducting a mixture of fluids to said tip and a chamber having an inclined wall and with which chamber the inlet end of said passageway communicates, an injector projecting into said chamber in substantially axial alinement with the inlet to said passageway, a conduit for supplying fluid to said injector, and a conduit adapted to discharge another fluid against the inclined wall of said chamber.

5. In a burner of the character described, the combination of a head and a tip, said head having a passageway for conducting a mixture of fluids to said tip and a cylindrical chamber with which the inlet end of said passageway communicates, an injector projecting into said chamber, a conduit for supplying fluid to said injector, and a conduit adapted to conduct another fluid to said chamber and to discharge such fluid against the cylindrical wall of said chamber at a point spaced from the said passageway.

6. In a burner of the character described, the combination of a head having a chamber and a tip communicating therewith, a chamber in said head at one side of the first mentioned chamber, a passageway connecting said chambers, an injector projecting into the second chamber in substantially axial alinement with the said passageway, a conduit for supplying fluid to said injector, and a second conduit adapted to discharge another fluid into the second chamber and against the wall thereof at a point spaced from said passageway.

7. In a burner of the character described, the combination of a head having a chamber and a tip communicating therewith, a chamber in said head at one side of the first mentioned chamber, a passageway connecting said chambers, an injector projecting into the second chamber in substantially axial alinement with the said passageway, a conduit for supplying fluid to said injector, and a second conduit adapted to discharge another fluid into the second chamber and against an inclined portion of the wall thereof at a point spaced from said passageway whereby a whirling motion will be imparted to the second fluid by such inclined portion of the chamber wall.

8. In a burner of the character described, the combination of a head having a chamber and a tip communicating therewith, a cylindrical chamber in said head at one side of the first mentioned chamber, a passageway connecting the upper portion of the second chamber with the first mentioned chamber, an injector projecting into the second chamber in substantially axial alinement with the said passageway, a conduit for supplying fluid to said injector, and a second conduit adapted discharge another fluid into said chamber beneath said injector and against the cylindrical wall of the chamber below said passageway.

9. In a burner, the combination of a head the lower end whereof is externally threaded, a tip adapted to be carried by said head and to communicate therewith, a gland nut threaded onto the lower end of said head and having an inwardly directed shoulder beneath such end and a downwardly directed extension adapted to form an elongated bearing with said tip, thereby to center the same, the said extension being rounded inwardly toward the bottom thereof to provide a shedding surface for molten metal or slag, and packing material interposed between said shoulder and the lower end of said head.

10. In a burner, the combination of a head the lower end whereof is externally threaded, a tip adapted to be carried by said head and to communicate therewith, and a gland nut threaded onto the lower end of said head and having a downwardly directed extension adapted to provide an elongated bearing with said tip to center the same, the said extension being rounded inwardly toward the bottom thereof to provide a shedding surface for molten metal or slag.

In testimony whereof, I hereunto affix my signature.

JOHN HARRIS.